United States Patent [19]

Landler

[11] 4,302,254
[45] Nov. 24, 1981

[54] PROCESS FOR THE MANUFACTURE OF PIGMENT PREPARATIONS

[75] Inventor: Josef Landler, Hofheim am Taunus, Fed. Rep. of Germany

[73] Assignee: Hoechst Aktiengesellschaft, Frankfurt am Main, Fed. Rep. of Germany

[21] Appl. No.: 131,229

[22] Filed: Mar. 17, 1980

Related U.S. Application Data

[63] Continuation of Ser. No. 949,632, Oct. 10, 1978, abandoned.

[30] Foreign Application Priority Data

Oct. 11, 1977 [DE] Fed. Rep. of Germany ....... 2745679

[51] Int. Cl.$^3$ ................. C08K 5/00; C08L 91/06; C08L 91/08
[52] U.S. Cl. .................................... 106/272; 106/271; 106/288 Q; 106/308 F; 106/308 M; 106/309; 106/298; 106/307
[58] Field of Search ............... 106/308 M, 308 F, 298, 106/307, 288 Q, 272, 309; 264/117

[56] References Cited

U.S. PATENT DOCUMENTS

| | | | |
|---|---|---|---|
| 1,651,733 | 12/1927 | Sheppard et al. | 106/308 F |
| 3,577,489 | 5/1971 | Rosenthal | 264/117 |
| 3,755,244 | 8/1973 | Hart | 264/117 |
| 3,773,535 | 11/1973 | Burgyan et al. | 106/298 |
| 3,808,019 | 4/1974 | Spange et al. | 106/308 B |
| 3,856,699 | 12/1974 | Miyano et al. | 106/308 F |
| 4,055,439 | 10/1977 | Bäbler | 106/288 Q |
| 4,158,571 | 6/1979 | Lynch | 106/272 |
| 4,235,641 | 11/1980 | Engelmann et al. | 106/308 M |

*Primary Examiner*—Helen M. McCarthy
*Attorney, Agent, or Firm*—Curtis, Morris & Safford

[57] ABSTRACT

An easy method for preparing pigment preparations on wax basis in an aqueous medium is treating the pigment in the aqueous medium with a solution of the wax in an organic solvent. The so-obtained preparations are easily dispersible in lacquers and plastic masses and allow to obtain the full tinctorial strength of the pigment without needing much energy for dispersing the pigment in the substrate.

4 Claims, No Drawings

PROCESS FOR THE MANUFACTURE OF PIGMENT PREPARATIONS

This is a continuation of application Ser. No. 949,632 filed Oct. 10, 1978, now abandoned.

Pigment preparations on the basis of wax are described for example in German Pat. No. 2,204,223, according to which these pigment preparations for the dyeing of polyolefins are manufactured by adding to the pigments the aqueous solution of an alkali metal silicate and a polyethylene dispersion during the manufacture or the formation of the pigments, and by working them up in a manner usual for pigments. According to Example 5, a polyethylene wax dispersion is used which is obtained by stirring the hot melt into the aqueous medium.

It has now been found that easily dispersible pigments in the form of a preparation on the basis of wax are obtained in an aqueous medium in simple manner, when the pigment is treated in the aqueous medium with a solution of the wax.

By the common denominator "waxes", there are to be understood substances being from kneadable to brittle at room temperature, but not glass-like, and polishable with slight pressure, the consistency and solubility of which depend to a very great extent on the temperature, and which melt at a temperature of more than about 40° C. without decomposition to form a non-ropy liquid of relatively low viscosity. Suitable in accordance with the invention are all waxes soluble in an organic solvent. Therefore, natural or synthetic waxes may be used, for example beeswax, montan wax, carnauba wax, paraffins, chemically modified waxes obtained for example by oxidation of crude montan wax and, optionally, by esterification, and polyethylene or polypropylene waxes.

The required amount of wax depends on the pigment and the intended application, and may thus vary within relatively wide limits. Generally, about 2 to 30% of wax, relative to the weight of the dry pigment, will be used. Larger amounts, although possible, for example in the case where the wax serves as diluent, generally do not bring about any advantage. An amount of from 5 to 10% of wax is preferred.

For reasons of easier work-up, the waxes used should be non-volatile or only slightly volatile with steam.

As solvents, there are advantageously used those organic solvents which dissolve well the wax and which can be easily separated from the aqueous medium, for example by steam distillation. Examples of such solvents are aliphatic hydrocarbons or the chlorination products thereof such as gasoline or kerosene, chloroform, tetrachloromethane or tetrachloroethylene; aromatic hydrocarbons such as benzene or xylene, or the halogenation or nitration products thereof such as chlorobenzene, dichlorobenzene, trichlorobenzene or nitrobenzene; cycloaliphatic hydrocarbons such as cyclohexane, tetrahydronaphthalene or decahydronaphthalene; furthermore turpentine and the substitute products thereof. Depending on the nature of the waxes, aromatic bases such as aniline, toluidine, dimethyl-anilide or quinoline, or esters or amides such as benzoic acid methyl ester, phthalic acid dibutyl ester of hexamethyl-phosphoric acid-trisamide may alternatively be used, as well as mixtures of any of these solvents.

From 0.1 to 2% by weight of emulsifiers may be added to the wax solution, which then requires less agitating energy. In the case where a correspondingly vigorous agitator is at hand, this addition of an emulsifier is generally not necessary.

A preferred embodiment of the invention consists in stirring the wax solution into the aqueous medium, and formation of the pigment occurs in this agitated mixture. Alternatively, the wax solution may be added during or immediately after formation of the pigment. In many cases, a thermal after-treatment is advantageous.

Depending on the kind and amount of the wax and solvent used, and the kind of thermal after-treatment, the size of the pigment particles and their grain size distribution can be influenced to a very great extent. The thermal after-treatment may be carried out at a temperature of up to 200° C., preferably of from 40° to about 140° C., for a period of from 1 to 20 hours. Of course, in the case of temperatures above the boiling point of the solvent or the water, operations have to be carried out in a closed vessel.

The pigment so prepared is isolated in usual manner. The solvent can be distilled off with steam, whereafter the aqueous pigment suspension is filtered off, the filtrate is washed with water and dried, for example in a drying cabinet with air circulation. Alternatively, the pigment can be separated from the solvent-containing aqueous phase, and the filtrate is washed with a water-miscible solvent in which the wax is insoluble. This water-miscible solvent, for example alcohol, may subsequently be eliminated by washing with water. According to a further alternative method, the aqueous-moist pigment still containing solvent amounts is washed exclusively with water, and dried under reduced pressure, for example in a rotary or tumbling dryer.

In all cases, the pigment is obtained in a form which can be easily ground to powder form. The pigment preparations of the invention are distinguished by their excellent dispersibility and their versatile application. They are suitable for the manufacture of lacquers and, on dispersion in usual corresponding apparatuses, attain their full tinctorial strength after a short time already.

When the pigment preparations of the invention are incorporated into thermoplastic materials such as polyvinyl chloride, speck-free dyeings of high tinctorial strength are obtained even when operating at elevated temperature, e.g. at 160° C., where there are only low-shearing forces.

The pigment preparations of the invention are furthermore excellently suitable for the manufacture of masterbatches from pigments and polyethylene waxes or polypropylene waxes, which can be processed without any trouble to filaments or sheets.

As compared to the preparations known from German Pat. No. 2,204,223, the preparations of the invention are distinguished by an increased dispersibility and thus fitness for the manufacture of filaments. Furthermore, any soluble wax may be used for the preparations of the invention; thus, emulsifiable waxes are not specially required.

The following examples illustrate the invention; parts and percentages being by weight unless otherwise stated.

EXAMPLE 1

100 Parts of perylene-3,4,9,10-tetracarboxylic acid-dianhydride are dissolved at 80°–90° C. in 4 liters of water with addition of 72 parts of potassium hydroxide. At room temperature and with vigorous agitation, a solution of 5 parts of polyethylene wax (molecular weight: about 2000, non emulsifiable, dropping point: 103°–107° C., solidification point: 90°–94° C., acid and saponification number: 0, density at 20° C.: 0.91–0.92) in 20 parts of xylene is stirred in. Subsequently, the batch is acidified distinctly with 440 parts of hydrochloric acid (31%). Agitation is continued for one hour, and the pigment suspension is then after-treated first for 1 hour at 60° C. and subsequently for 4 hours at 95° C. The pigment preparation is isolated by suction-filtration, washed with water until it is neutral and free from salts, and dried in a vacuum drying cabinet at 80°–90° C.

Yield: 105 parts of pigment preparation.

The ground pigment preparation is excellently dispersible. On dyeing of polyvinyl chloride and the manufacture of lacquers, the tinctorial strength is excellent. After the manufacture of a usual masterbatch, excellent pigment distribution and tinctorial strength become manifest on blowing of polyethylene sheets or spin dyeing of polyolefins.

EXAMPLE 2

250 Parts of the trans-isomer of the potassium hydroxide addition compound of naphthoylene-bis-benzimidazole Vat Orange C.I. 71 105 containing 40% of pure pigment are introduced into a mixture consisting of 2 liters of water having a temperature of 10° C. into which previously a solution of 5 parts of commercial paraffin (solidification point: 45°–50° C.) in 75 parts of chloroform was stirred with vigorous agitation. Agitation is continued at 20°–25° C. for 15 hours, the chloroform is then distilled off, the pigment preparation is isolated by suction-filtration, washed to neutral with water, and the filter cake is dried at 80°–90° C. in a drying cabinet with air circulation.

Yield: 105 g of pigment preparation.

The pigment dried to become chalky and soft can be easily ground. On incorporation into polyvinyl chloride, the excellently dispersible pigment preparation displays high tinctorial strength. This pigment preparation can furthermore be applied with success in other fields as indicated in Example 1.

EXAMPLE 3

A pigment preparation is manufactured as described in Example 2. However, instead of the solution of paraffin in chloroform, a solution of 5 parts of beeswax in 20 parts of chlorobenzene is used. After the agitation has been continued for 15 hours at 20°–25° C., the pigment preparation with the chlorobenzene adhering is isolated by suction-filtration and washed to neutral with water. The moist filler cake is dried in a heatable tumbling or rotary dryer, or in a vacuum drying cabinet at 80°–90° C.

Yield: 105 g of pigment preparation.

The ground pigment is excellently dispersible and thus allows use in a broad range of application fields.

EXAMPLE 4

455 Parts of the cis-isomer of the sodium hydroxide addition compound of naphthoylene-bis-benzimidazole containing 22% of pure pigment are introduced with vigorous agitation into a mixture consisting of 2 liters of water having a temperature of 5° C. in which a solution of 5 parts of the wax described in Example 1 in 20 parts of chlorobenzene was thoroughly stirred. Agitation of the pigment suspension is continued for 3 hours at room temperature. Subsequently, the suspension is heated to 70°–75° C., and agitation is continued for a further 2½ to 3 hours. The chlorobenzene is then distilled off with steam, the pigment is isolated by suction-filtration, washed to neutral with water and dried at 80°–90° C. in a drying cabinet with air circulation.

Yield: 105 parts of pigment preparation.

The pigment dried to become chalky and soft can be easily ground. The excellent dispersibility of this pigment preparation allows use in a wide range of applications (as indicated in Example 1). The excellent pigment distribution and tinctorial strength become especially manifest on dyeing of polyolefins in the mass.

EXAMPLE 5

455 Parts of the cis-isomer of the sodium hydroxide addition compound of naphthoylene-bis-benzimidazole containing 22% of pure pigment are introduced with vigorous agitation into a previously prepared mixture having a temperature of 5° C. and consisting of 2 liters of water in which a solution of 5 parts of the wax described in Example 1 in 20 parts of chlorobenzene was thoroughly stirred. Agitation of the pigment suspension is continued for 3 hours at room temperature. Subsequently, the suspension is suction-filtered, the chlorobenzene adhering to the preparation is eliminated by washing with ethanol, and the filtrate is then washed to neutral with water. Drying is carried out at 80°–90° C. in a drying cabinet with air circulation.

Yield: 105 parts of pigment preparation. The pigment so isolated is identical with the substance obtained according to Example 4.

EXAMPLE 6

Example 4 is repeated; however, 0.3 g of an addition product of 18 mols of ethylene oxide on stearyl alcohol as emulsifier is added to the chlorobenzene solution. The preparation so obtained corresponds to the product according to Example 4 with respect to the dyeing properties.

EXAMPLE 7

250 Parts of an aqueous paste containing 40% of carbon black are introduced into a vessel with agitator, and with vigorous agitation, a solution of 5 parts of the wax described in Example 1 in 20 parts of xylene is added. After a 1 hour agitation, the suspension is heated to 90°–95° C., and the solvent is distilled off with steam. The paste of carbon black is isolated on a filter press, and dried at 80°–85° C. in a drying cabinet with air circulation.

Yield: 105 parts of carbon black preparation. The carbon black preparation so obtained is very well dispersible and may be applied in many fields.

EXAMPLE 8

250 Parts of an aqueous-moist paste containing 40% of lead chromate (obtained from sodium dichromate and lead nitrate) are stirred with 100 parts of water, and a solution of 5 parts of the wax described in Example 1 and 0.3 part of the emulsifier indicated in Example 6 in 20 parts of chlorobenzene is stirred into the above suspension. Agitation having been continued for 1 hour, the pigment preparation is isolated on a filter press, and dried at 80° C. in a vacuum drying cabinet.

Yield: 105.2 parts of pigment preparation.

The pigment preparation so obtained displays excellent dispersibility. The same pigment preparation may be obtained without addition of the emulsifier; however, agitation has to be more vigorous in this case.

EXAMPLE 9

Example 2 is repeated; however, 15 parts of the parrafin in 60 parts of chlorobenzene are used, and, agitation being terminated, the chlorobenzene is distilled off with steam after having heated the mixture to 90° C. A pigment preparation having properties comparable to those indicated in Example 2 is obtained.

EXAMPLE 10

Example 8 is repeated; however, 175 parts of the 40% lead chromate (corresponding to 70 g of 100% strength) are treated with 30 parts of the wax dissolved in 120 parts of chlorobenzene. A pigment preparation having properties comparable to those indicated in Example 8 is obtained.

I claim:

1. A method of preparing a pigment composition having improved dispersibility, which comprises vigorously agitating an aqueous dispersion of a pigment precursor selected from the group consisting of the potassium hydroxide addition and sodium hydroxide addition compounds of naphthoylene-bis-benzimidazole, converting said pigment precursor to a pigment in said dispersion, mixing an organic solvent solution of a wax, the amount of wax being such that its weight in the pigment composition prepared is 5 to 10% of the weight of the dry pigment, with said dispersion before or during the formation of said pigment, thermally treating the waxed pigment particles in the dispersion at a temperature of from 40° to 140° C., isolating the waxed pigment from the dispersion, freeing the waxed pigment from adhering solvent and aqueous medium, and drying and grinding the waxed pigment.

2. A method as claimed in claim 1, wherein the aqueous medium contains an emulsifier.

3. A method as claimed in claim 1, wherein the wax is a polyethylene wax, a paraffin or beeswax.

4. A pigment preparation made by the method of claim 1.

* * * * *